(12) United States Patent
Gort-Barten (10) Patent No.: US 12,139,322 B2
(45) Date of Patent: Nov. 12, 2024

(54) BEVERAGE CAPSULE

(71) Applicant: Alex Gort-Barten, Crawley (GB)

(72) Inventor: Alex Gort-Barten, Crawley (GB)

(*) Notice: Subject to any disclaimer, the term of this patent is extended or adjusted under 35 U.S.C. 154(b) by 0 days.

(21) Appl. No.: 16/768,513

(22) PCT Filed: Nov. 8, 2018

(86) PCT No.: PCT/EP2018/080680
§ 371 (c)(1),
(2) Date: May 29, 2020

(87) PCT Pub. No.: WO2019/092144
PCT Pub. Date: May 16, 2019

(65) Prior Publication Data
US 2020/0385204 A1    Dec. 10, 2020

(30) Foreign Application Priority Data

Nov. 8, 2017 (GB) .................................... 1718489
Nov. 14, 2017 (GB) .................................... 1718829
(Continued)

(51) Int. Cl.
*B65D 85/804* (2006.01)
*B32B 7/12* (2006.01)
(Continued)

(52) U.S. Cl.
CPC ............ *B65D 85/8064* (2020.05); *B32B 7/12* (2013.01); *B32B 9/02* (2013.01); *B32B 15/12* (2013.01);
(Continued)

(58) Field of Classification Search
CPC . B32B 15/12; B32B 15/20; B32B 2307/7163; B32B 2581/00; B32B 7/12;
(Continued)

(56) References Cited

U.S. PATENT DOCUMENTS 1,927,859 A    9/1933  Wald
2017/0158422 A1  6/2017  Andreae et al.

FOREIGN PATENT DOCUMENTS

EP    0512148 A1    11/1992
EP    0870457 A1    10/1998
(Continued)

OTHER PUBLICATIONS

United Kingdom Intellectual Property Office, Patent No. GB2569042, Request for a Validity Opinion, Jul. 17, 2020.
(Continued)

*Primary Examiner* — Yan Lan
(74) *Attorney, Agent, or Firm* — Stites & Harbison, PLLC; David W. Nagle, Jr.

(57) ABSTRACT

A capsule for use in a coffee machine having a generally frusto-conical form with an upper surface and a lower surface, an annular flange being provided at the lower surface. The annular flange is provided with annular sealing means which deforms plastically in use when engaged by a capsule cage of a coffee machine to provide a seal, the seal being held in position on the flange by one or more protrusions from the capsule wall.

12 Claims, 7 Drawing Sheets

(30) Foreign Application Priority Data

| Nov. 30, 2017 | (GB) | 1719993 |
|---|---|---|
| Dec. 14, 2017 | (GB) | 1720894 |
| Jan. 18, 2018 | (GB) | 1800830 |

(51) Int. Cl.
- B32B 9/02 (2006.01)
- B32B 15/12 (2006.01)
- B32B 15/20 (2006.01)
- B65D 65/40 (2006.01)

(52) U.S. Cl.
CPC .............. *B32B 15/20* (2013.01); *B65D 65/40* (2013.01); *B32B 2307/7163* (2013.01); *B32B 2581/00* (2013.01)

(58) Field of Classification Search
CPC ...... B32B 9/02; B65D 65/40; B65D 85/8064; B65D 85/8043; B65D 85/8046; B65D 85/8055; B65D 85/8052; B65D 85/8049; B65D 65/466; B65D 85/8061; B65D 85/804; B65D 53/06; B65D 85/8058; B65D 77/08; B65D 81/32; B65D 2565/385; Y02W 90/10
See application file for complete search history.

(56) References Cited

FOREIGN PATENT DOCUMENTS

| EP | 1654966 A | 5/2006 |
|---|---|---|
| EP | 1700548 B1 | 8/2007 |
| EP | 1849715 A | 10/2007 |
| EP | 2070828 A | 6/2009 |
| EP | 2318199 A1 | 5/2011 |
| EP | 2364930 A2 | 9/2011 |
| EP | 2443046 B1 | 9/2015 |
| ES | 1073281 U | 11/2010 |
| GB | 2523775 A | 9/2015 |
| GB | 2552796 A | 2/2018 |
| GB | 2569042 B | 6/2019 |
| JP | H05199938 A | 8/1993 |
| JP | 2003120816 A1 | 4/2003 |
| JP | 2004025659 A | 1/2004 |
| JP | 2009531099 A | 9/2009 |
| JP | 2010504183 A | 2/2010 |
| JP | 2011515133 A | 5/2011 |
| WO | 2005004683 A1 | 1/2005 |
| WO | 2007/113100 A2 | 10/2007 |
| WO | WO2007/113100 * | 10/2007 |
| WO | 2010/137956 A1 | 12/2010 |
| WO | 2012138473 A1 | 10/2012 |
| WO | 2015101394 A1 | 7/2015 |
| WO | 2016041596 A1 | 3/2016 |
| WO | 2016186488 A1 | 11/2016 |
| WO | 2016186491 A1 | 11/2016 |
| WO | 2016186493 A1 | 11/2016 |
| WO | 2017118768 A1 | 7/2017 |
| WO | 2017187024 A1 | 11/2017 |

OTHER PUBLICATIONS

Nestle/Nespresso, "Boosting the benefits of aluminum at Nespresso," Jul. 14, 2020.

United Kingdom Intellectual Property Office, Patent No. GB2569042, Observations in Response to Request for a Validity Opinion, Aug. 26, 2020.

United Kingdom Intellectual Property Office, Patent No. GB2569042, Reply to Observations in Response to Request for a Validity Opinion, Sep. 9, 2020.

Eval Evoh Marketing Brochure, "Aroma preservation without aluminum?".

EDV Press Release, "Enhancing the Coffee experience with a barrier capsule."

United Kingdom Intellectual Property Office, Patent No. GB2569042, Opinion No. 12/20, Oct. 26, 2020.

European Patent Office, Third Party Observations, Patent No. GB2569042, Jun. 10, 2021.

* cited by examiner

BEVERAGE CAPSULE

The invention relates to a beverage capsule for an espresso machine, in particular for making espresso under high pressure.

Powered espresso machines are well known. The conventional espresso machine comprises a water chamber, a heating element adapted to heat the water to around 95-98 C, which is then pumped under high pressure of 15 to 19 bar to a filter holder or portafilter. Lower pressure systems also exist. The filter holder typically comprises a handle portion and a holder portion provided with two or three lugs that are adapted to engage in the installed position with the machine brewhead to where the water is pumped. The holder portion is adapted to receive a filter, which is usually a metal bowl with a number of perforations through its bottom. In use, the filter is filled with finely ground coffee and the water is forced through the coffee at the high pressure generated by the pump to produce the espresso coffee which is collected in a cup placed under the filter holder.

The classic coffee machine suffers from two potential drawbacks. The first drawback is that ground coffee starts to lose its freshness and flavour after a few days and so for the optimum espresso, the user will also need to have a coffee grinder. The other drawback is that the used espresso coffee has to be removed from the filter, which can lead to mess as the grinds are fine.

This lead to the development of ESE coffee pods, which can be used in many espresso machines. Coffee pods are generally individually wrapped to maintain freshness and consist of a small pod made of a perforated filter paper which contains the coffee. The pod is placed in the filter holder and then disposed of after use. Coffee pods are convenient but have to fit the filter holder and be placed correctly otherwise water can leak around the edge.

This in turn lead to the development of capsule machines. The coffee capsules for these machines are completely sealed. The capsule machines do not use the conventional filter holder. A capsule machine typically has a two part mechanism. The first part receives the capsule and is provided with an extraction surface upon which the capsule rests. The second part is provided with a locking lever which is used to make the first and second parts integral. In use, the second part cuts the upper surface of the capsule to allow water to enter the capsule and percolate down through the capsule, where it exits through the lower surface of the capsule at multiple locations determined by the geometry of the extraction surface. An example of such a machine is disclosed in EP 0870457 or WO2005/004683. Capsules in the known capsule coffee machines are, in use, inserted into a capsule cage of the machine which holds the capsule in position so that it may be cut by a cutting member.

Capsule machines have proved to be commercially very successful as they are very convenient to use and produce a consistent product. However, each manufacturer's coffee machines and capsules are designed to work with the manufacturers own brand. The most popular brand of capsule is Nespresso®, which uses a sealed capsule made of aluminium. In use, the capsule is clamped into position in the machine with a capsule cage part holding the capsule so that it can be cut by typically three prongs to enable water under pressure to enter the coffee capsule.

Aluminium has the considerable advantage that it is oxygen and water impermeable, which means that the coffee in the capsules has a long shelf life. Aluminium however also suffers from several major drawbacks in that the aluminium is easily deformed during the filling and packing stage and it is difficult and expensive to produce a reliable seal on the capsule rim. The only known seal that works is a silicone elastomer disclosed in EP1654966 despite significant research effort. In these capsules the silicone is added in numerous locations around the circumference of the capsule to eventually form a continuous uninterrupted flexible seal on the flange. The known solutions to these problems further require an extremely high capital investment beyond most companies.

Most manufacturers have therefore adopted plastic capsules. Plastic capsules solve the problems of the ease of handling the capsule during the packing process but require other compromises. The plastic capsule needs to be able to be pierced by the blades in the capsule coffee machine without shattering the capsule or damaging the machine. The capsule also needs to be sealed at its open end with an aluminium foil which adheres to the plastic capsule in a reliable manner and at low enough temperatures that the quality of the coffee is not impaired. An exemplary capsule is shown in GB2458013.

A particular problem with known aluminium capsules is that the silicone seal means that the capsule cannot be recycled easily despite the significant ecological benefit in recycling aluminium and they are not recyclable in normal kerbside mixed collections. Special collection of the capsules negate the benefits of recycling.

The present invention therefore seeks to provide an improved coffee capsule.

According to the invention there is provided a capsule for use in a high pressure espresso coffee machine, which machine has a capsule cage for retaining the capsule in an extraction position, wherein the capsule is formed from a ductile metal, the capsule having a generally frusto-conical form with an upper surface and a lower surface, an annular flange being provided at the lower surface, which annular flange is provided with sealing means on the surface facing towards the upper surface, wherein the sealing means comprises a ring formed from a cellulose material or paper, which ring deforms plastically in use when engaged by a capsule cage of a coffee machine to provide a seal, the seal being held in position on the flange.

Preferred embodiments of the capsule are disclosed in the sub-claims.

The capsule of the invention facilitates the use of an aluminium capsule with a seal that can be recycled in common mixed recyclable kerbside collections.

Exemplary embodiments of the invention will now be described with reference to the drawings, in which.

Figure 1:
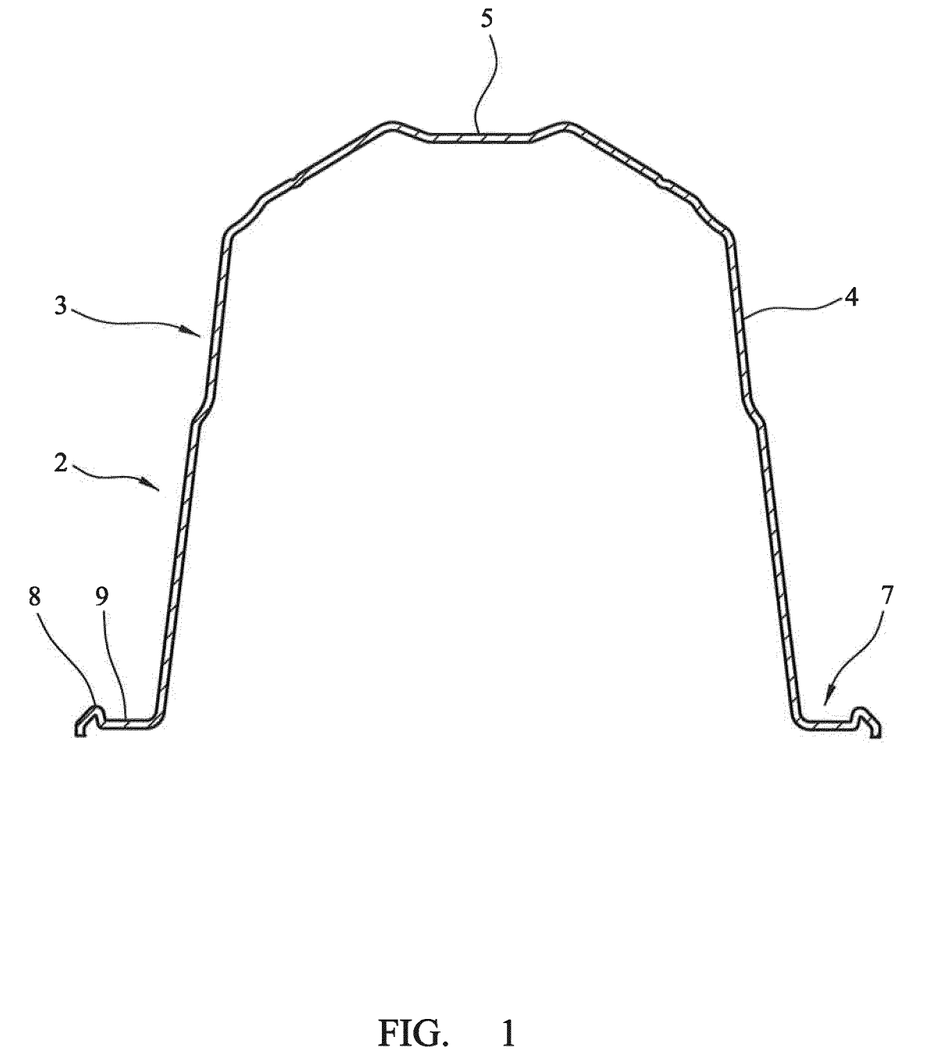
FIG. 1 shows a cross sectional view of a first embodiment of the capsule.

FIG. 1 shows a cross-section of capsule 1 having a generally frustoconical form for the main body 2. The upper end 3 of the capsule has a second frustoconical section 4 with a smaller diameter than the lower end. The upper end 3 is further provided with an additional frustoconical indent 5 at the centre of the upper end 3. The capsule is provided with a flange 7 at the end of main body 2 remote from the upper end 3.

The flange 7 comprises an upstanding wall 8, which thereby forms a gutter 9 between the wall of the capsule and the upstanding wall 8. The upstanding wall 8 then bends back down towards the same side as the opening such that the distal end is substantially in the longitudinal plane of the capsule but below the gutter 9. The shape of the distal end forms an open hook. The open hook receives a seal to close the capsule after filling. The open hook shape provides a plurality of webs at the rim of the flange which provide a degree of reinforcement so that the foil can be easily attached to the capsule made of softer, more ductile materials such as aluminium.

The gutter 9 receives a ring shaped seal that is preferably made of paper, fibre or cork or polystyrene. The seal can be substantially in the range of 0.1-0.3 mm thick.

Figure 5A:
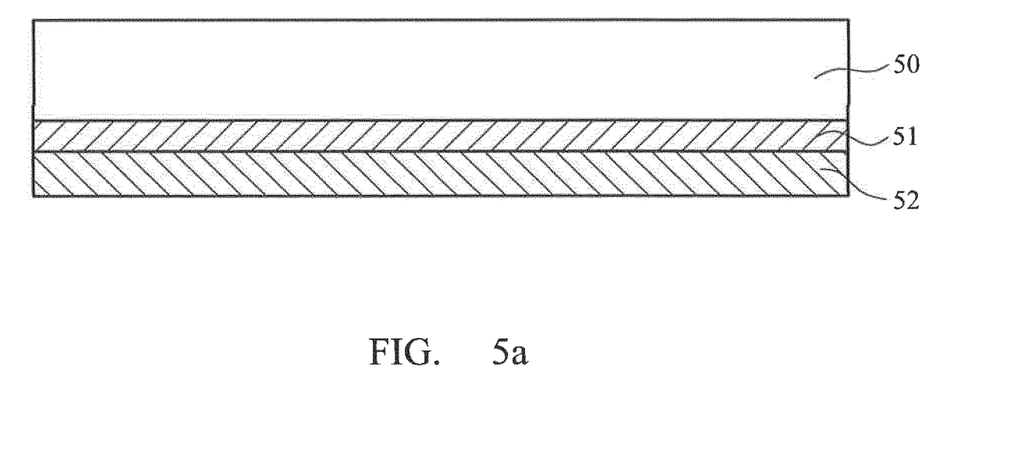
FIG. 5a shows a first seal construction

In a first embodiment, illustrated in more detail in FIG. 5*a*, the seal comprises a layered structure having a first layer 50 formed of card or cellulose based material having a weight in the range of 100-400 $gm^{-2}$, a second layer 51 comprising a heat seal lacquer or adhesive having a weight of 3-15 $gm^{-2}$ and a third layer 52 formed from a biodegradable plastic or bioplastic such as is formed from corn starch pulp. This seal has a thickness in the range of 0.1-0.3 mm, preferably around 0.25 mm. This seal is biodegradable.

Figure 5B:
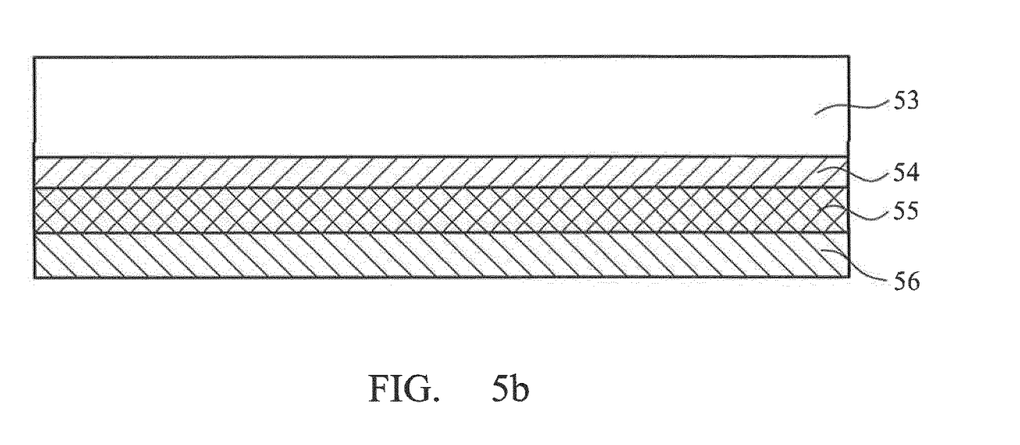
FIG. 5b shows a second seal construction

An alternative seal construction illustrated in FIG. 5*b* comprises a layered structure having a first layer 53 formed of card or cellulose based material having a weight in the range of 100-400 $g/m^2$, a second layer 54 comprising a heat seal lacquer or adhesive having a weight of 3-15 $gm^{-2}$, an aluminium foil layer 55 between 10-35 microns thick and a further layer 56 comprising a heat seal lacquer or adhesive having a weight of 3-15 $gm^{-2}$ This seal has a thickness in the range of 0.1-0.3 mm, preferably around 0.25 mm. This seal can be easily recycled in most domestic recycling along with the capsule.

Another seal comprises 120 $gm^{-2}$, 0.2 mm thick paper. A polypropylene material seal of 0.1 mm also provides a good seal.

An alternative paper seal is 0.1 mm thick and provided with an adhesive layer 0.1 mm thick.

Residual water in the brewhead causes a small amount of swelling of the paper or cellulose material when the coffee machine is in use, which swelling enables a better engagement with castellations on the brewhead thereby improving the seal.

In one embodiment the seal is attached to the gutter using an adhesive. In a second embodiment the seal is mounted over the capsule prior to the pressing of the flange to form the upstanding wall 8 so that the pressing holds the ring in position on the seal without the need for crimping. The seal in this case will provide additional strength to the capsule flange, which results in a better sealing performance.

It has further been surprisingly found that the seal does not need to be made of an elastomeric material such as silicone. The non elastic deformation of paper or other cellulose based material provides a sufficiently strong seal that there is no meaningful leakage in known capsule machines.

Figure 2:
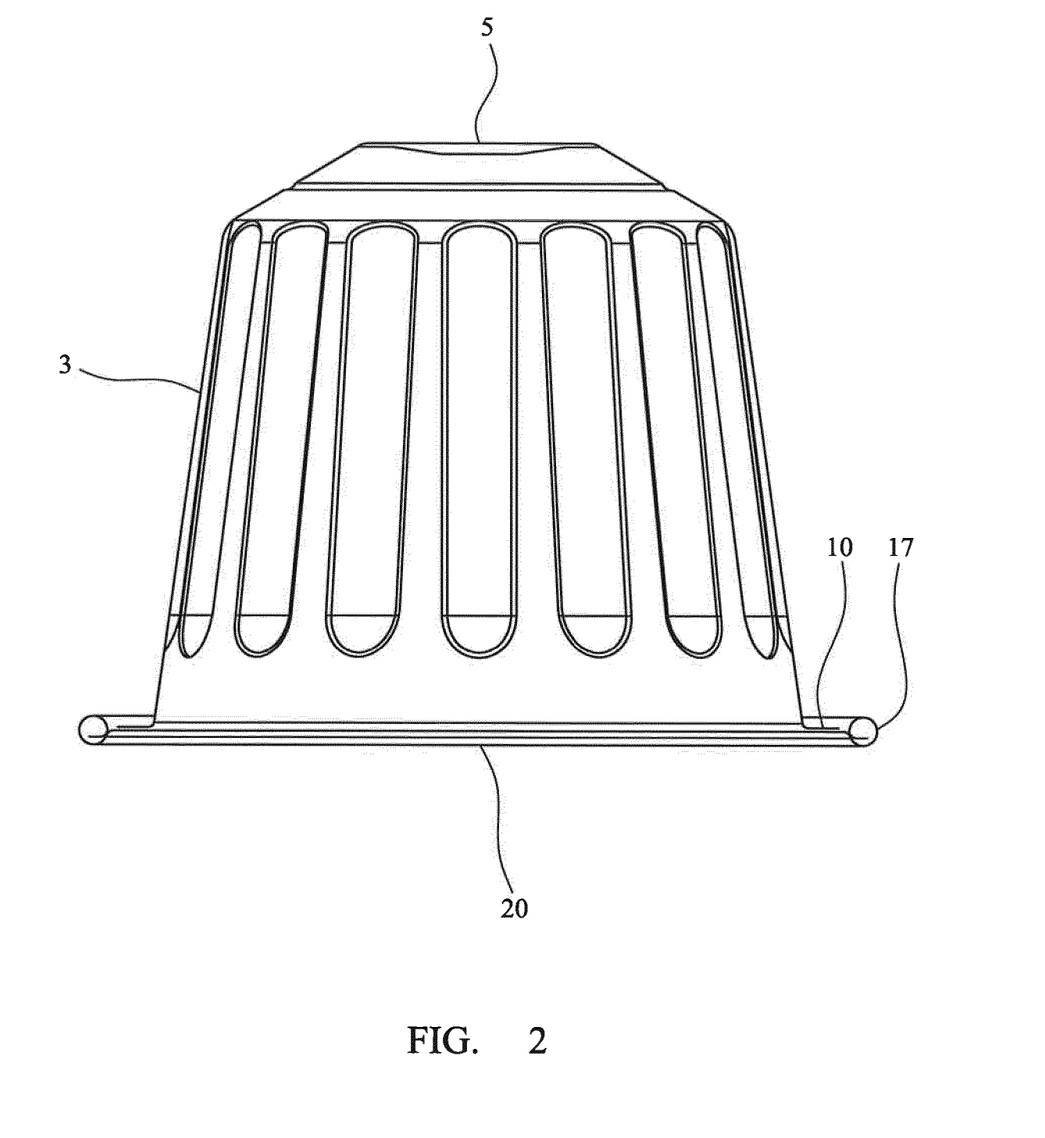
FIG. 2 shows a cross sectional view of a second embodiment of the capsule.

FIG. 2 shows a similar capsule to that of FIG. 1 made of a ductile metal such as aluminium having a generally frustoconical form for the main body 2. The upper end 3 of the capsule has a second frustoconical section 4 with a smaller diameter than the lower end. The upper end 3 is further provided with an additional frustoconical indent 5 at the centre of the upper end 3. The capsule is provided with a flange 17 at the end of main body 2 remote from the upper end 3 and is closed by a foil 20.

The edge of flange 17 is bent rolled over to retain the seal in position. The edge of the flange is then provided with a plurality of crimps 18 disposed on the edge of the flange, which crimps help prevent the deformation of the seal 19 by the rolling process and also contribute to the structural rigidity of the flange 17. The crimps 18 abut the edge of the seal but do not pinch the seal. Pinching a paper seal would cause it to be damaged and reduce its effectiveness.

Figure 3:
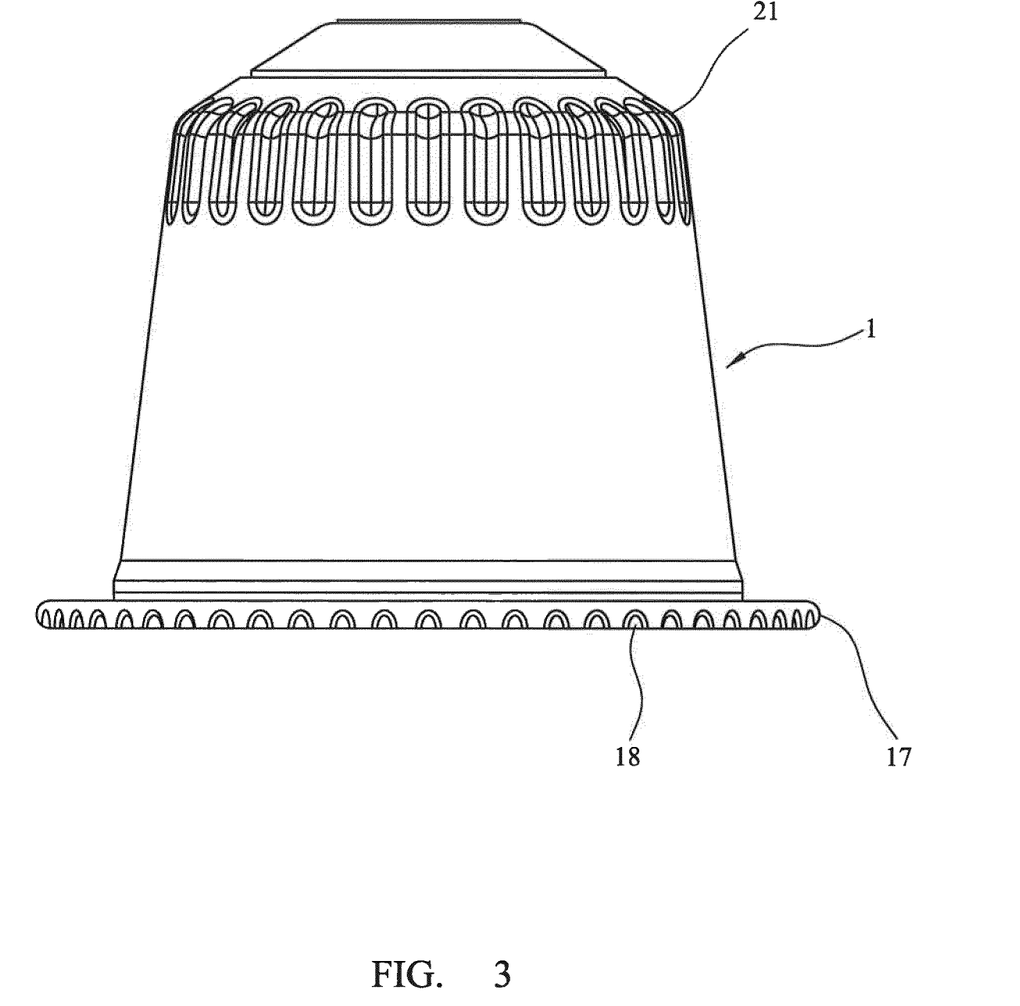
FIG. 3 shows a side view of the capsule of FIG. 2.

FIG. 3 shows a side view of the capsule of FIG. 2 and in particular the crimps 18 on the flange 17. One problem with aluminium capsules is that the upper end 3 of the capsule remote from the flange 7 is weakened by the forming process and liable to be damaged. The provision of a plurality of indented ribs 21 disposed at the upper part of the main body 2 and extending onto the second frustoconical section 4 has been surprisingly found to impart sufficient additional rigidity to the capsule that failures and damage are significantly reduced.

In a further embodiment, the seal can comprise an aluminium annulus which sits on the rim of the capsule. With respect to the embodiment of FIG. 2, the seal is therefore the same material as the capsule, which will result in production efficiencies. The seal can also be a different colour to the colour of the capsule. The aluminium ring is preferably between 0.1 to 0.2 mm thick. In a further preferred aspect, the ring is formed from aluminium with an adhesive backing, so that the seal adheres to the rim. In this latter case, retention by the capsule wall is not required.

Figure 4:
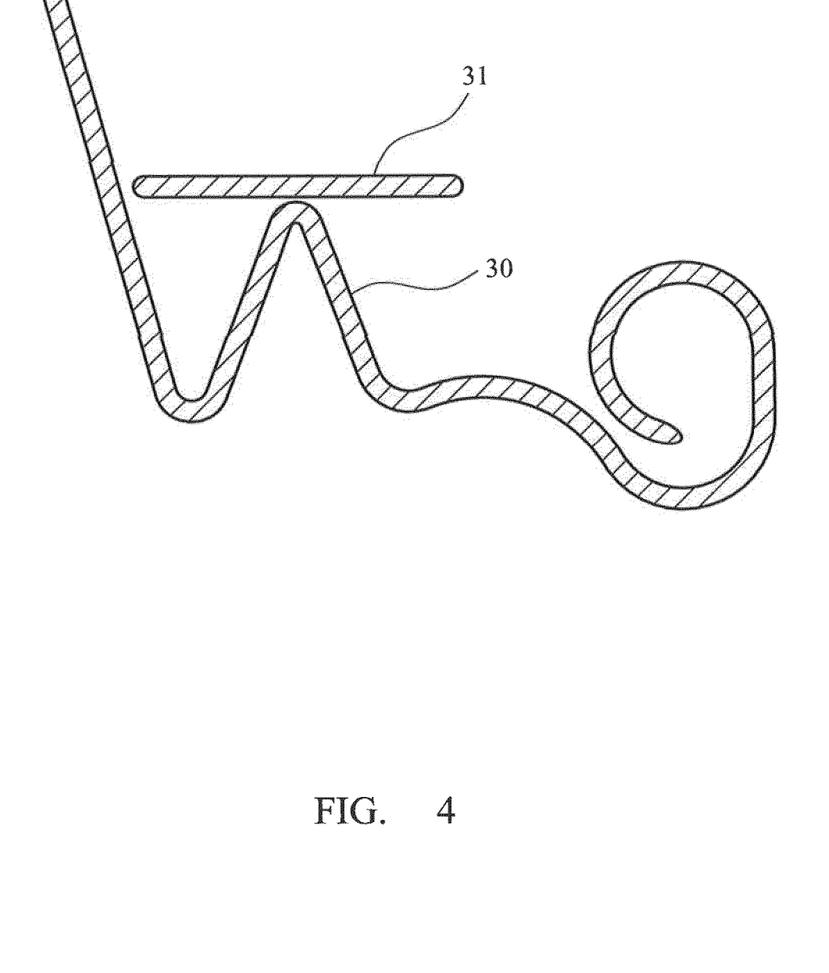
FIG. 4 shows a further embodiment of a seal.

In a further embodiment, shown in more detail with respect to FIG. 4, in which the capsule is preferably formed from anodised aluminium, the capsule flange rim is provided with an upstanding rib 30 arranged to engage with a capsule cage of an espresso machine. The rib is formed by a fold in the aluminium forming the flange. The seal in this case is provided by an aluminium ring or gasket 31 placed over the flange and covering the upstanding rib 30. The aluminium ring is preferably between 0.1 and 0.3 mm thick. The edge of the flange is rolled over towards the capsule wall and the upstanding rib. In use, the capsule cage will press the ring into the rib to thereby form a seal between the cage and the capsule flange.

A further material that is particularly suitable for use with the embodiment of FIG. 1 where composability is desired is triplex laminate paper with a weight of 50 $gm^{-2}$. An advantage of triplex laminate paper is that it has greater wet strength than conventional paper but remains compostable. The triplex laminate paper may have an adhesive underside and/or may be made with an internal diameter greater than the diameter of the flange so that it comes up the side of the capsule wall say 0.5 mm and then is trapped under the rim on its outer edge.

FIGS. 6 to 9 show further embodiments of the capsule of the invention in which it is possible to dispense with the adhesive layer on the seal with an aluminium capsule.

Figure 6:
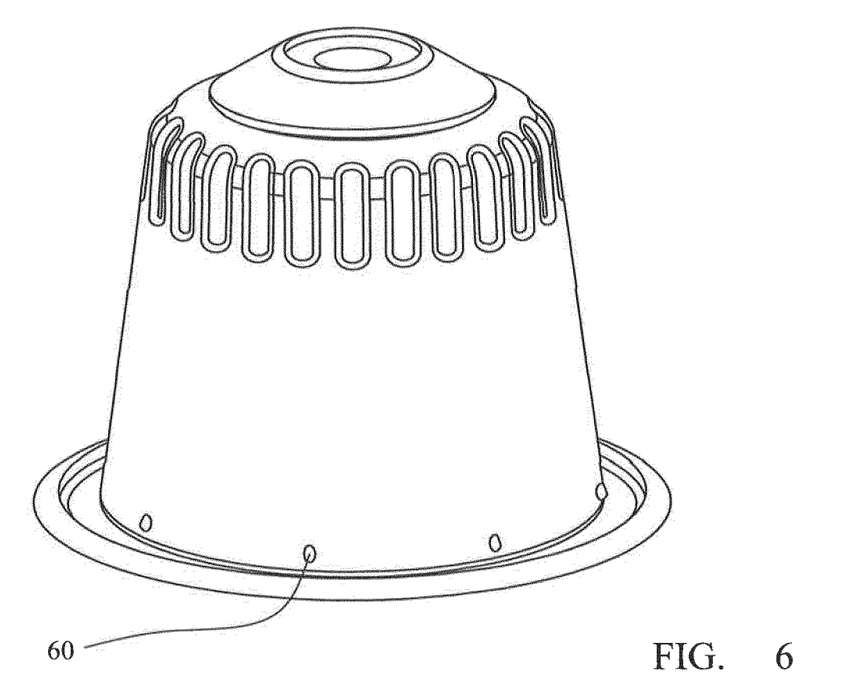
FIGS. 6-9 show a further embodiment of the capsule

With the embodiment of FIG. 6, prior to filling the capsule with coffee, a paper ring is dropped onto the conveyor basket, the capsule is inserted into the basket and then 3 or more pips 60, preferably 6 pips, are pushed out of the side wall of the capsule at a short height above the flange. These can be pushed out by spring loaded prongs that simply hit the side wall. This way the seal is then held into position and will not fall off.

Figure 7:
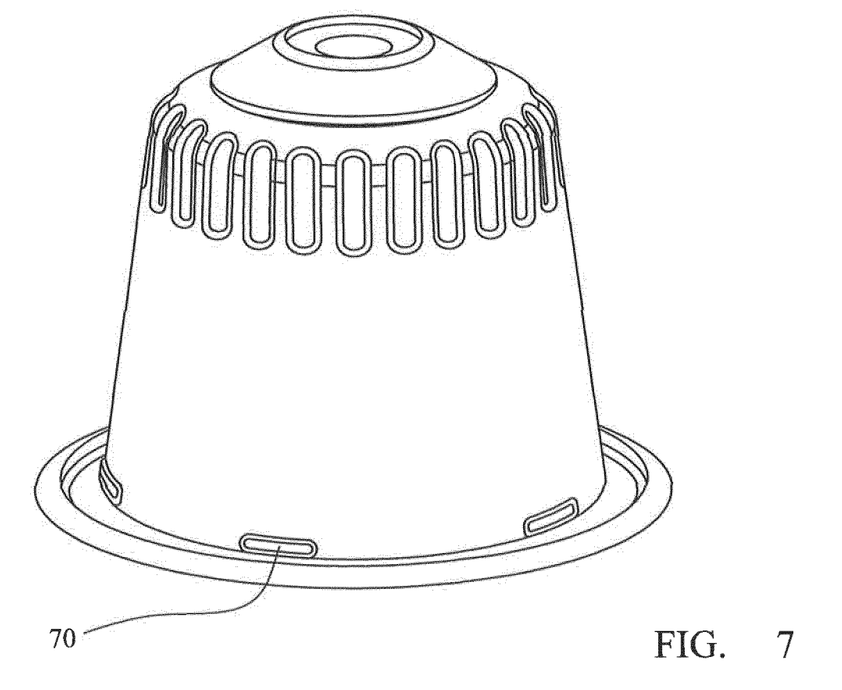
Figure 8:
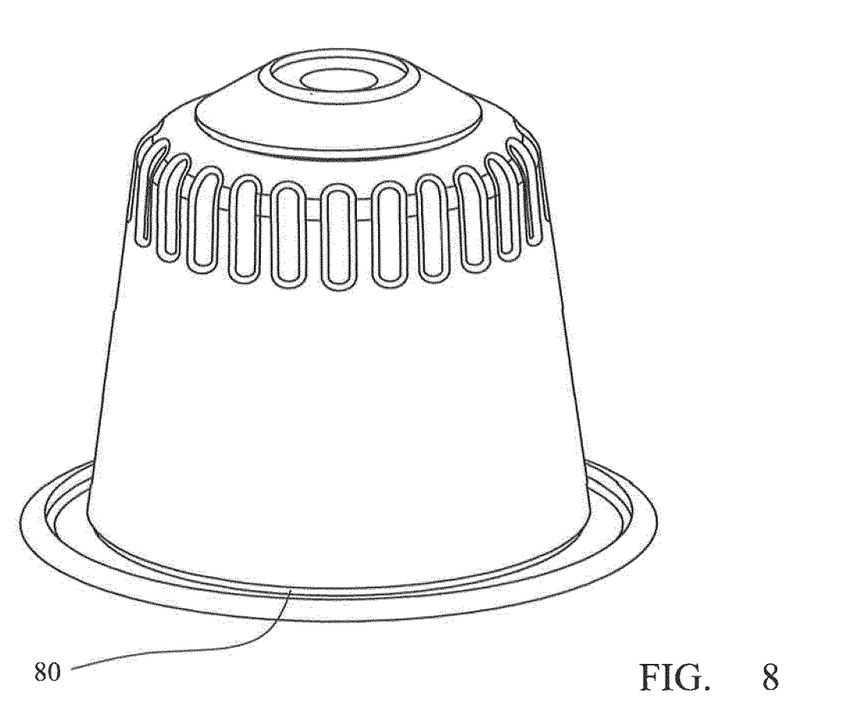
Figure 9:
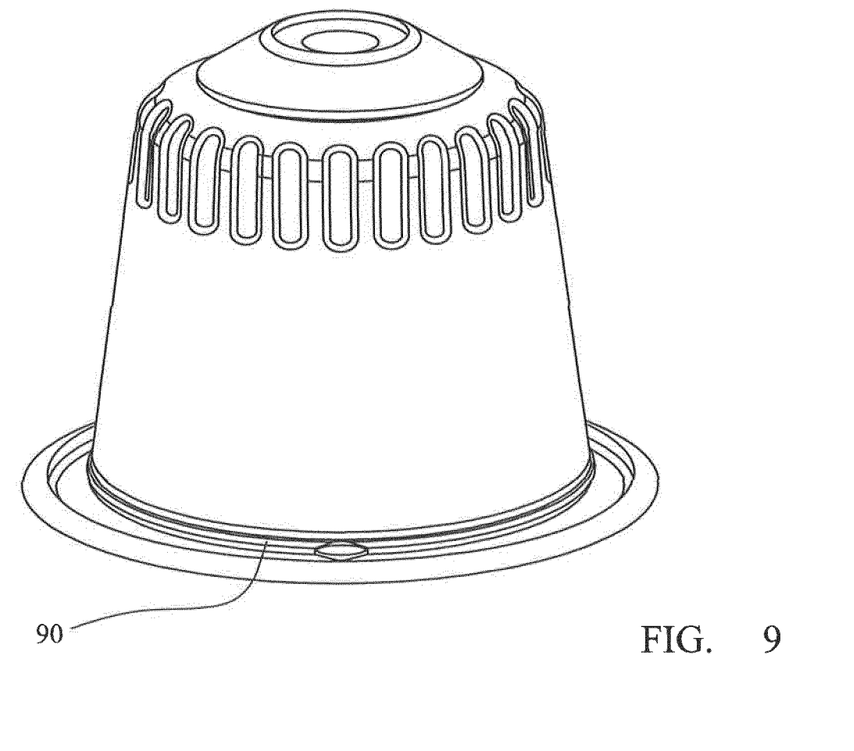

In the embodiment of FIG. 7, the pips are replaced with a lozenge shape 70. In the embodiment of FIG. 8, an annular wall 80 is pushed in from the outside to provide an overhang to retain the seal in position. In the embodiment of FIG. 9, an annular wall 90 is pushed out from the inside of the capsule.

Although the capsule has been specifically described as being used to make espresso coffee, it would be possible to use the capsule to make other beverage capsules such as tea or chocolate.

The invention claimed is:

1. A capsule for use in a high pressure espresso coffee machine, which machine has a capsule cage for retaining the capsule in an extraction position, wherein the capsule is formed from a ductile metal, the capsule having a generally frusto-conical form with an upper surface and a lower surface, an annular flange being provided at the lower surface, which annular flange is provided with a sealing means on a surface of the flange facing towards the upper surface of the capsule, wherein the sealing means comprises a ring formed from a cellulose material or paper, which ring is substantially flat and has a vertical cross-section with a rectangular shape, and which ring deforms plastically in use when engaged by the capsule cage of a coffee machine to provide a seal, the seal being held in position on the flange.

2. The capsule according to claim 1, wherein the sealing means comprises a first layer of cellulose material and a second layer of adhesive material.

3. The capsule according to claim 2, wherein the sealing means comprises a further layer of a bioplastic material.

4. The capsule according to claim 2, wherein the sealing means comprises a further layer of aluminium foil and a further adhesive layer.

5. The capsule according to claim 1, wherein the ring is formed of a cellulose material with a weight in the range of 100-400gnr$^2$.

6. The capsule according to claim 1, wherein the ring has a thickness of between 0.1 and 0.3 mm.

7. The capsule according to claim 1, wherein the ring is approximately 0.25 mm thick.

8. The capsule according to claim 1, wherein water in the capsule cage causes a small amount of swelling of the cellulose material or paper of the ring.

9. The capsule according to claim 1, wherein the sealing means comprises a triplex laminate.

10. The capsule according to claim 9, wherein the triplex laminate has an adhesive underside.

11. A capsule for use in a high pressure espresso coffee machine, which machine has a capsule cage for retaining the capsule in an extraction position;
   wherein the capsule is formed from a ductile metal, the capsule having a generally frusto-conical form with an upper surface and a lower surface, an annular flange being provided at the lower surface, which annular flange is provided with a sealing means on a surface of the flange facing towards the upper surface of the capsule;
   wherein the sealing means comprises a ring, which ring is substantially flat and has a vertical cross-section with a rectangular shape, and which ring deforms plastically in use when engaged by the capsule cage of a coffee machine to provide a seal, the seal being held in position on the flange; and
   wherein the ring is a layered structure that includes (i) a first layer of cellulose material, (ii) a second layer of adhesive material, and (iii) a third layer of a bioplastic material.

12. A capsule for use in a high pressure espresso coffee machine, which machine has a capsule cage for retaining the capsule in an extraction position;
   wherein the capsule is formed from a ductile metal, the capsule having a generally frusto-conical form with an upper surface and a lower surface, an annular flange being provided at the lower surface, which annular flange is provided with a sealing means on a surface of the flange facing towards the upper surface of the capsule;
   wherein the sealing means comprises a ring, which ring is substantially flat and has a vertical cross-section with a rectangular shape, and which ring deforms plastically in use when engaged by the capsule cage of a coffee machine to provide a seal, the seal being held in position on the flange; and
   wherein the ring is a layered structure that includes (i) a first layer of cellulose material, (ii) a second layer of adhesive material, (iii) a third layer of aluminium foil, and (iv) a fourth layer of adhesive material.

* * * * *